May 20, 1969
J. K. HALE ET AL
3,444,676
DRIVE
Filed March 23, 1965
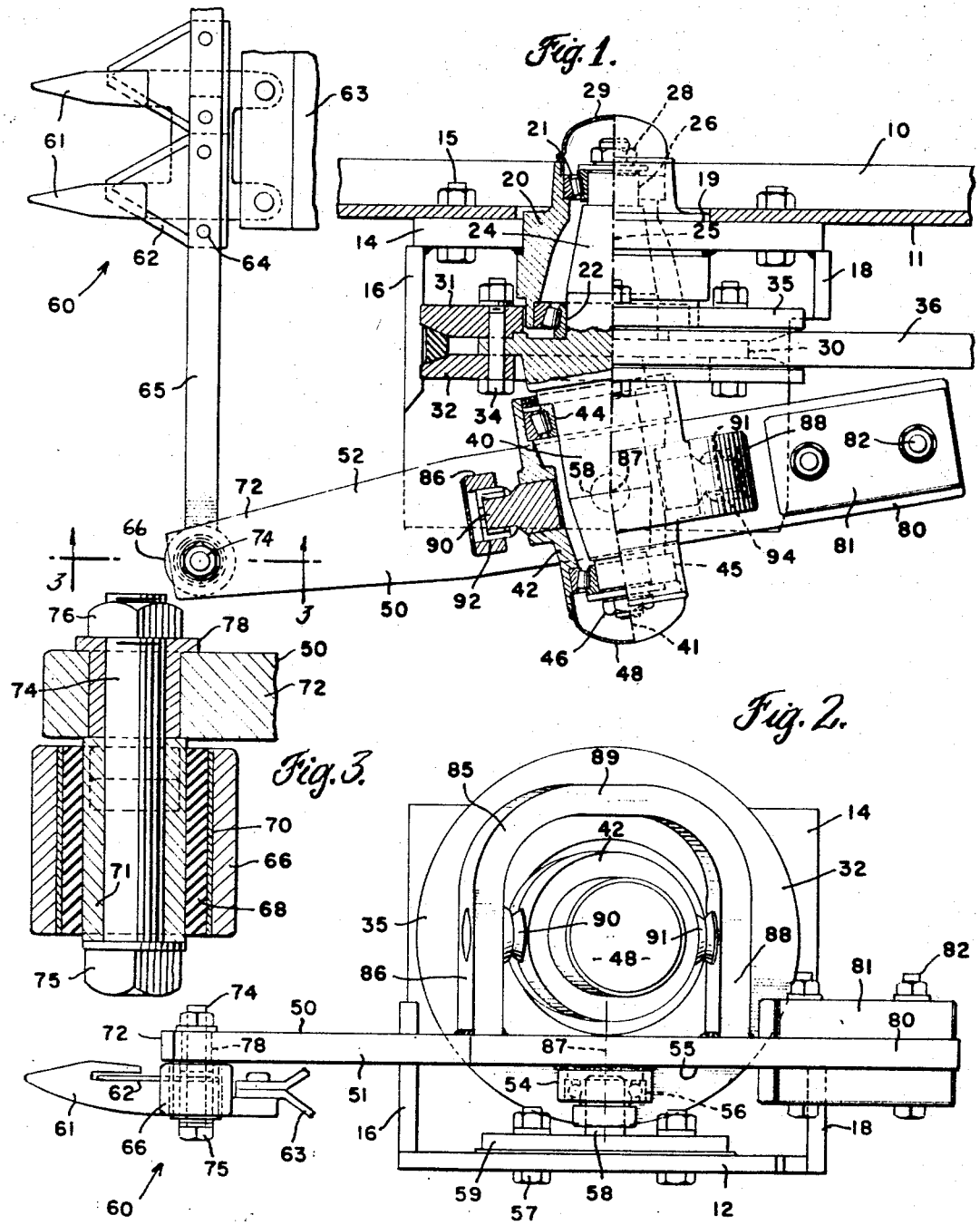
INVENTORS
JOHN K. HALE
EMMETT F. GLASS
RICHARD P. BERNHARDT
BY
*Joseph G. Brown*
ATTORNEY

United States Patent Office 3,444,676
Patented May 20, 1969

3,444,676
DRIVE
John K. Hale, New Holland, Emmett F. Glass, Akron, and Richard P. Bernhardt, Leola, Pa., assignors to Sperry Rand Corporation, New Holland, Pa., a corporation of Delaware
Filed Mar. 23, 1965, Ser. No. 442,021
Int. Cl. A01d 55/02
U.S. Cl. 56—296                                      10 Claims

ABSTRACT OF THE DISCLOSURE

A sickle drive mechanism having an elongated horizontally extending drive arm supported for pivotal movement about a vertically extending axis, one end of the drive arm being pivotally connected to the sickle, a pair of legs affixed to the drive arm on opposite sides respectively of said vertical axis and extending in the same direction upwardly thereof, a wobble drive projecting between said legs, and means pivotally connecting diametrically opposite sides of the wobble section to said legs whereby when said shaft is rotated said legs and drive arm are oscillated and the sickle is reciprocated.

---

This invention relates to agricultural machines and more particularly to a drive mechanism for reciprocating a sickle in an agricultural implement.

In driving a reciprocating sickle in a forage cutting machine, wobble drive elements are frequently employed because they provide a simple means for changing a rotatable drive force to an oscillating action. One approach to utilizing an oscillating wobble action is to connect a wobble element to a vertical shaft and connect a horizotal drive arm to the shaft. One end of the drive arm is then pivotally connected to the sickle to be reciprocated and a counterweight may be provided on the opposite end of the arm.

A substantial problem with a drive of the character described is that the shaft oscillating about the vertical axis and the drive arm oscillating about a horizontal plane must be both of extremely heavy and rugged construction. Further, the shaft and the arm must be provided with a heavy connection; otherwise the torsional forces developed between them will fracture the connection. However, when the shaft and arm components are made of heavy metal components, the mass of the drive is great, thereby increasing the problems of balancing the drive. The heavier the shaft and drive arm, the larger the counterweight must be. Further, when a design is capable of handling the torsional loads developed between the shaft and the drive arm, the structure then requires a very heavy support frame to protect against frame failures.

A main object of this invention is to provide a sickle drive mechanism of the character described having improved means for connecting a wobble element to a drive arm whereby the drive arm is protected against undesirable torsional forces and is instead subjected to easily handled bending forces.

Another object of this invention is to provide a sickle drive mechanism of the character described wherein the drive arm and the connection means to the wobble element are of relatively light weight construction, providing long operative life without failure.

Another object of this invention is to provide a sickle drive mechanism of the character described wherein a resilient lost-motion connection is provided between the drive arm and the sickle to cushion the shock loads resulting at ends of strokes, to thereby further enable a lighter weight drive arm and wobble element.

Another object of this invention is to provide a sickle drive mechanism of the character described wherein the drive arm is supported for rotatable movement about a vertical pivot, such pivot being separate from the connection between the wobble element and the drive arm.

A further object of this invention is to provide a sickle drive mechanism of the character described which is of light weight design whereby the support frame may be made of thinner gauge material, both the drive and the frame providing a low cost structure, fully capable nevertheless of superior performance over longer periods than the heavier, more expensive drives of prior design.

A still further object of this invention is to provide a sickle drive mechanism which is simple, easily fabricated, quickly assembled and having components accessible for ready repair.

Other objects of this invention will be apparent hereinafter from the specification and from the recital in the appended claims.

In the drawing:

FIG. 1 is a fragmentary plan view, partly in horizontal section, showing a sickle drive mechanism constructed according to this invention;

FIG. 2 is an end elevation of the drive mechaism looking upwardly from the lower side of FIG. 1; and FIG. 3 is a section, on an enlarged scale, taken on the line 3—3 of FIG. 1 looking in the direction of the arrows.

Referring now to the drawing by numerals of reference, 10 denotes a support frame having a vertical side wall section 11. Extending horizontally therefrom is a bottom support section 12 having an integral upright plate 14 rigidly connected to side 11 by bolts 15. Bottom support 12 and upright plate 14 are welded together as shown and braced by web members 16 and 18. It will be noted in FIG. 1 that vertical support 11 has an opening 19.

Welded or otherwise rigidly connected to plate 14 and projecting through the opening 19 is a casting 20 having spaced tapered roller bearings 21 and 22 which support a transverse drive shaft 24. Shaft 24 is supported for rotation about horizontal axis 25. One end 26 of shaft 24 is connected to bearing 21 by a nut 28 and the shaft end is closed by a cap 29 which fits into casting 20.

The medial portion of shaft 24 has an integral radially outwardly extending disc element 30 which forms the center of a pulley 35. On one side of element 30 is one pulley half 31; the opposite half 32 of the pulley is located on the opposite side of the element. The pulley halves and disc are interconnected by bolts 34. Extending around pulley 35 is a V-belt 36 driven from a suitable source of power, not shown.

The end of shaft 24 beyond pulley 35 and away from side wall 11 has a diagonally extending wobble element 40, the axis of which is shown at 41. The wobble element 40 includes a surrounding housing 42 supported on spaced tapered roller bearings 44 and 45 mounted on the wobble shaft. A nut 46 is threaded onto the wobble element and against bearing 45. A cap 48 is provided which fits into housing 42.

Wobble element 40 overlies an elongated drive arm 50 which comprises a flat bar extending in a horizontal plane. In a vertical direction, the sides 51 of drive arm 50 are relatively thin and in a lateral direction the drive arm is relatively narrow with respect to the length of the arm whereby a flat top surface 52 is provided. The medial portion of drive arm 50 has a ring 54 welded to its underside 55 and in which a ball bearing 56 seats. Projecting into ring 54 is a pivot pin 58 having a vertically extending axis. Pivot pin 58 is carried on support 12 by a plate 59 rigidly attached to the support by bolts 57.

Extending horizontally is a sickle 60 having a cutter bar 63 and forwardly projecting guards 61. Reciprocately slidable on the guards are sickle blade sections 62 which are triangularly shaped in plan, as is conventional.

The sickle blades are connected by rivets 64 to a connecting rod 65. At one end, rod 65 has an enlarged head 66 in which a resilient rubber bushing 68 is located. Between head 66 and bushing 68 a sleeve 70 is provided and within the bore of the bushing, a collar 71 is located as shown in FIGURES 2 and 3. The bushing is bonded to both the sleeve and the collar and is located wholly within the plane of the sickle. This bonding may be by means of a bonding agent or the parts may be so tightly related that the inner and outer surfaces of bushing 68 do not rotate relative to the sleeve and collar. It will be noted that collar 71 projects both downwardly and upwardly beyond the ends of bushing 68 and head 66 of rod 65.

One end 72 of drive arm 50 is connected by means of a bolt 74 to rod 65. The bolt extends through collar 71 and it has an axis parallel to the axis of drive arm pivot pin 58. The head 75 of bolt 74 engages the bottom of collar 71. A nut 76 is threaded on the upper end of the bolt for engagement with an insert piece 78 between the end 72 of the drive arm 50 and the upper end of the collar. When nut 76 is tight, the insert 78 is held in a fixed position relative to the arm 50, and the collar 71 is clamped between the head of the bolt 75 on one side and the arm 50 and insert 78 on the other side whereby the collar 71 cannot rotate relative to the arm 50.

The opposite end 80 of drive arm 50 has a pair of counterweights 81 connected to it by bolts 82. One counterweight is above arm 50 and the other right below it. The center of the weight mass is somewhat higher than the plane in which the sickle blades 62 travel.

Drive arm 50 is supported by and connected to wobble element 40 to be oscillated thereby through a yoke 85 having a pair of vertically extending legs 86 and 88 interconnected by a horizontal bight portion 89. Yoke 85 straddles wobble element 40 and the legs 86 and 88 are located at diametrically opposite sides respectively of the wobble housing 42. Further, the legs are spaced along the length of the arm 50, intermediate the ends thereof and are located substantially the same lateral distance from the vertical axis 87 of pivot pin 58. The lower ends of the yoke legs are welded to the top surface 52 of the drive arm 50, as shown.

At opposite sides of wobble housing 42, outwardly projecting studs 90 and 91 are provided which project into needle bearings 92 and 94, respectively, on the legs 86 and 88 of the yoke 85. The needle members of the bearings are transverse the axis 87 of pivot pin 58. The overall relationship of these components is such that the axis 25 of shaft 24 intersects the axis 41 of wobble element 40 in a location on the vertical pivot axis 87 of pivot pin 58. Further, this invention is in the medial central plane of the yoke 85 and the centers of the needle bearings 92 and 94.

In operation, when pulley 35 is rotated, shaft 24 is driven and the wobble element transmits an oscillating force to yoke 85. This yoke 85, through its fixed connection to drive arm 50, causes the drive arm to oscillate on pivot pin 58 and sickle 60 is reciprocated. The spaced legs 86 and 88 of yoke 85 interconnected by bight 89, transmits horizontal bending forces to drive arm 50. However, torsional forces on the pivot axis of the pin 58 are removed and the bending forces are related to the wide lateral component of the drive arm. This enables the use of a drive arm 50 of much thinner construction than would be required if the arm was driven by a vertically extending shaft connected to the arm in one location and driven by the wobble element.

It has been found that a drive arm thickness may be used which is less than one half of the thickness required when other drive components are used. The described design of the drive arm and the yoke, provides a design with a minimum mass of material. As a result, smaller counterweights 81 may be provided in the structure than are otherwise needed. Further, the lost-motion connection between drive arm 50 and the sickle 60, resulting from rubber bushing 68, enables absorption of shock loads of the drive at both ends of each drive stroke. Preferably, the rubber bushing is made of very hard material enabling about a twenty thousandths deflection of the connection at each end of a stroke. The total deflection provided in the connection is thus about forty thousandths of movement from one side to the other of the axis of bolt 74. The absorbed shock loads results in a design having a long operating life, without damage or fatigue. Further, the overall arrangement, being of relatively light weight, enables the employment of a vertical support 11 which is of lighter gauge than would otherwise be required.

The arrangement described is less expensive to manufacture than drive structures of prior design and the components of the design are readily accessible for repair. Further, construction and assembly of the drive is facilitated by the arrangement of the components employed.

While this invention has been described in connection with a particular embodiment thereof, it will be understood that it is capable of modification and this application is intended to cover any variations, uses, or adaptations following, in general, the principles of the invention including such departures from the present disclosure as come within known or customary practice in the art to which the invention pertains, and as fall within the scope of the invention or the limits of the appended claims.

Having thus described our invention, what we claim is:

1. A drive mechanism for reciprocating a sickle comprising an elongated planar horizontally extending relatively narrow drive arm, means pivotally supporting said arm for movement about a vertically extending axis, means adjacent one end of said drive arm connecting said arm to said sickle, a pair of upwardly extending legs spaced along the length of said drive arm intermediate the ends of the arm and affixed to said arm on opposite sides of said vertical axis and extending in the same direction upwardly thereof, a transverse driven shaft having a wobble section projecting between said legs and spaced therefrom, and means pivotally connecting diametrically opposite sides of said wobble section to said legs whereby when said shaft is rotated, said legs and drive arm are oscillated and said sickle is reciprocated.

2. A drive mechanism for reciprocating a sickle as recited in claim 1, wherein said means adjacent one end of said drive arm connecting said arm to said sickle is comprised of a bolt extending through said arm and a resilient bushing secured in one end of said sickle.

3. A drive mechanism for reciprocating a sickle as recited in claim 1, wherein said legs are located on said arm substantially equidistant from said vertically extending axis.

4. A drive mechanism for reciprocating a sickle as recited in claim 1, wherein said means pivotally connecting said wobble section to said legs comprise needle bearings having needle elements extending perpendicular to said vertically extending axis.

5. A drive mechanism for reciprocating a sickle as recited in claim 1, wherein said pair of spaced legs comprise part of a yoke having a bight portion extending parallel to and spaced above said drive arm.

6. A drive mechanism for reciprocating a sickle as recited in claim 1, wherein said drive arm comprises a relatively thin bar having said legs connected to said drive arm generally midway between the sides of said bar.

7. A drive mechanism for reciprocating a sickle as recited in claim 1, wherein a counterweight is connected to said drive arm on the end away from said connection to said sickle.

8. A drive mechanism for reciprocating a sickle as recited in claim 1, wherein said means pivotally supporting said drive arm for movement about a vertically extending axis includes a vertically extending pivot pin medially pivotally connected to said arm.

9. A drive mechanism for reciprocating a sickle as recited in claim 8, wherein a ring is fixed to said drive arm concentric to said pivot pin and into which said pin projects and a bearing is interposed between said ring and said pivot pin.

10. A drive mechanism for reciprocating a sickle as recited in claim 8, wherein said driven shaft extends in a horizontal direction, the axis of said pivot pin intersecting the axis of said driven shaft at the point where the axis of said wobble section meets the axis of said drive shaft.

References Cited

UNITED STATES PATENTS

| | | | |
|---|---|---|---|
| 2,258,517 | 10/1941 | Rose | 56—296 |
| 2,942,483 | 6/1960 | Evans et al. | 74—40 |
| 2,719,711 | 10/1955 | Nallinger | 287—85 |
| 2,787,486 | 4/1957 | Thiry | 287—85 |
| 2,880,027 | 3/1959 | Everitt et al. | 287—85 |
| 2,524,735 | 10/1950 | Pfau | 74—108 |
| 2,824,416 | 2/1958 | Orelind | 56—296 |
| 3,104,511 | 9/1963 | Clark | 56—25 X |
| 3,180,073 | 4/1965 | Tuft | 56—296 |
| 3,300,953 | 1/1967 | Glass | 56—1 X |

ABRAHAM G. STONE, *Primary Examiner.*

PASQUALE A. RAZZANO, *Assistant Examiner.*

U.S. Cl. X.R.

74—60